United States Patent

Nakamura et al.

Patent Number: 5,716,172
Date of Patent: Feb. 10, 1998

[54] DRILL

[75] Inventors: Shinichi Nakamura; Takeshi Inoue, both of Gifu-ken, Japan

[73] Assignee: Mitsubishi Materials Corporation, Tokyo, Japan

[21] Appl. No.: 440,617

[22] Filed: May 15, 1995

[30] Foreign Application Priority Data

May 13, 1994 [JP] Japan .................... 6-100281
May 13, 1994 [JP] Japan .................... 6-100282

[51] Int. Cl.$^6$ .................................................. B23B 51/02
[52] U.S. Cl. .................................... 408/230; 408/227
[58] Field of Search .......................... 408/223–225, 408/227–230, 715

[56] References Cited

U.S. PATENT DOCUMENTS 4,983,079  1/1991  Imanaga et al. ............. 408/230
5,078,554  1/1992  Kubota ........................ 408/230
5,230,593  7/1993  Imanaga et al. ............. 408/230

FOREIGN PATENT DOCUMENTS 0005708  1/1989  Japan ........................ 408/230
012408   5/1990  Japan ........................ 408/230
0124207  5/1990  Japan ........................ 408/230

*Primary Examiner*—Steven C. Bishop
*Attorney, Agent, or Firm*—Armstrong, Westerman, Hattori, McLeland & Naughton

[57] ABSTRACT

A chip discharge flute 22 is formed on the side surface of a drill main body 21 to be rotated about an axial line from the tip to the base end of the drill main body 21 and a cutting edge 25 is formed along the intersecting ridge where the wall surface 23 of the chip discharge flute 22 facing to the drill rotational direction thereof intersects with the tip flank 24 of the main body 21. A first cutting edge 26 is formed to a core thick portion at the tip of the drill main body 21 and linearly extending substantially from a rotational from a rotation center C of the drill by being applied with thinning. Further, three thinning surfaces 30, 31 and 32 are formed by the thinning at the intersecting portion where a wall surface 27 facing to the rear side of the drill rotational direction of the chip discharge flute 22 intersects with the tip flank 24, wherein the first thinning surface 30 faces to the drill rotational direction and is disposed to substantially stretch to the rotation center C of drill to define the first cutting edge along the intersecting ridge intersecting with the tip flank, the second thinning surface 31 faces to the external circumference of the drill main body 21, substantially stretches to the rotation center C of the drill and is disposed to intersect with the first thinning surface 30 by being curved to a concave shape, and the third thinning surface 32 faces to the rear side of the drill rotational direction and is disposed to the heel 28 side of the second thinning surface 31 so as to be curved to a concave shape with respect to the second thinning surface 31.

11 Claims, 4 Drawing Sheets

CUT OFF

BASE END

S TYPE, X TYPE ( CROSS THINNING ), N TYPE

DRILL

BACKGROUND OF THE INVENTION

1. Field of the Invention

The present invention relates to a drill arranged such that a chip discharge flute is formed on the side surface of a drill main body, which is to be rotated around an axial line from the tip toward the base end of the drill main body, and a cutting edge is formed along the intersecting ridge where a wall surface facing to the rotational direction of the drill of the chip discharge flute intersects with the tip flank of the drill main body.

2. Prior Art

There has been proposed a drill such as, for example, shown in FIG. 6 and FIG. 7 as a drill used to drill a hole into a metal material. This drill is disclosed in Japanese Patent Application Laid-Open No. 2(1990)-124208 and arranged such that a pair of chip discharge flutes 2, 2 are formed in a spiral shape on the side surface of a drill main body 1 to be rotated around an axial line 0 and a cutting edge 5 is formed obliquely upwardly toward the center of the drill along the intersecting ridge where a wall surface 3 facing to the rotational direction of drill (counterclockwise direction in FIG. 6) of the chip discharge flutes 2,2 intersects with the tip flank 4 of the drill main body 1. Further, thinning is applied to a rotation center C of the drill at the tip of the drill so that a thinning cutting edge 6 linearly extending from the rotation center C of the drill is formed in the vicinity of the rotation center C of the drill and smoothly stretches to the above cutting edge 5 through an arc-shaped intersection 7.

A thinning surface 9, formed along the intersecting portion where a wall surface 8 (facing to the rear side of the drill rotational direction of the chip discharge flute 2) intersects with the tip flank 4 is composed of a cutting surface (first thinning surface) 10 along the above thinning cutting edge 6 and a tip sharpening surface (second thinning surface) 12 which intersects with the first thinning surface 10 at an obtuse angle and extends from the rotational center C of the drill toward a heel 11. (The second thinning surface 12 intersects with the first thinning surface to make "an obtuse angle" between the two surfaces.) An intersecting ridge 13, of the latter second thinning surface 12, intersects with the tip flank 4 and is formed to linearly extend to an external circumference side from the rotational center C of the drill as shown in FIG. 6 when viewed from the extreme end (e.g. the tip) in the direction of the axial line 0, so that the intersecting portion of the above wall surface 8 with the tip flank 4 is entirely tilted toward the base end of the drill main body 1, and is scraped off as a portion approaches from the intersecting ridge 13 toward the rear side of the drill rotational direction. (The slanting line portion, shown as "////", is cut off to make the second thinning surface 12, as shown in FIG. 8.)

In the drill arranged as described above, however, since the first thinning surface 10 intersects with the second thinning surface 12 at an obtuse angle, on the thinning surface 9, and since the second thinning surface 12 is formed to be entirely tilted toward the base end as the second thinning surface 12 approaches from the linearly extending intersecting ridge 13 toward the rear side of the drill rotational direction, the heel 11 side of the tip flank 4 is greatly cut out as shown in FIG. 7. As a result, it is inevitable that the strength and rigidity of the drill main body 1 is damaged at the tip thereof.

In particular, since the wall thickness of the cutting edge 5 is reduced on the rear side of the drill rotational direction because the heel 11 side portion is greatly cut out, the strength of the cutting edge 5 is also damaged, and, thus, there is a possibility that the cutting edge can be broken or cracked. Further, if the intersecting angle at which the first thinning surface 10 intersects with the second thinning surface 12 is set at a large obtuse angle, the wall thickness of the thinning cutting edge 6 is also reduced on the rear side of the drill rotational direction, and a problem arises in that a lack of strength is caused over the entire cutting edge.

On the other hand, a chip made by the cutting edge 5 and the thinning cutting edge 6 in such a drill flows out while drawing a fan shape about the rotation center C of the drill, as shown by broken lines in FIG. 6 and FIG. 7, because a circumferential speed about the axial line is increased at locations of the drill main body 1 nearer to its external circumference. Then, the chip begins to curl in the vicinity of the bottom of the chip discharge flute 2 while being guided by the flute and fragmented there.

However, when the second thinning surface 12 of the thinning surface 9 is formed to be entirely tilted toward the base end as it approaches the rear side of the drill rotational direction (as the drill arranged as described above), since the chip comes into contact with the wall surface 8 of the chip discharge flute 2 with an insufficient contact length at the portion where the chip begins to curl, the chip is not sufficiently curled and the fragmenting property thereof is damaged. Consequently, since a long spiral chip, called a free chip (which is liable to be made at the beginning of drilling) is made, there is a possibility that the inner wall of a drilled hole is roughed up in the vicinity of the opening thereof by the chip and that the chip winds around the drill main body 1.

SUMMARY OF THE INVENTION

An object of the present invention made under the above background is to provide a drill capable of simultaneously improving a chip processing performance and the strength of cutting edges and the like at the tip of the drill.

According to the present invention, there is provided a drill, which comprises a chip discharge flute formed on the side surface of a drill main body to be rotated about an axial line from the tip to the base end of the drill main body, a cutting edge formed along the intersecting ridge where the wall surface of the chip discharge flute facing to the drill rotational direction thereof intersects with the tip flank of the drill main body, a first cutting edge formed to a core thick portion at the tip of the drill main body and linearly extending substantially from a rotation center of the drill by being applied with thinning, and at least three thinning surfaces formed by the thinning at the portion where a wall surface facing the rear side of the drill rotational direction of said chip discharge flute intersects with the tip flank, wherein the three thinning surfaces are composed of a first thinning surface facing to the drill rotational direction and disposed so as to substantially stretch to the rotation center of the drill to define the first cutting edge along the intersecting ridge intersecting with the tip flank, a second thinning surface facing to the external circumference of the drill main body, substantially stretching to the rotation center of the drill and disposed to intersect with the first thinning surface by being curved to a concave shape, and a third thinning surface facing to the rear side of the drill rotational direction and disposed to the heel side of the second thinning surface so as to be curved to a concave shape with respect to the second thinning surface.

In the drill arranged as described above, since the intersecting ridge where each of the first to third thinning surfaces intersects with the tip flank exhibit a "C" shape opening to the external circumference side of the drill main body when viewed from the extreme end of the direction of the axial line, the heel side of the tip flank is not entirely cut out by the second thinning surface as in the case of the aforesaid conventional drill, and as the third thinning surface is disposed to be curved to a concave shape with respect to the second thinning surface, a wall thickness can be sufficiently secured at the tip of the drill main body in the circumferential direction thereof. Consequently, the wall thickness of the cutting edge is also sufficiently secured on the rear side of the drill rotational direction so that the strength and the rigidity of the cutting edge are improved, and such that the strength of the drill main body itself can also be improved.

Further, since the heel side of the tip flank is not entirely cut out as described above, a contact length capable of sufficiently curling a chip guided by the chip discharge flute can be obtained, whereby a sufficient chip fragmenting property can be secured. Moreover, since the chip fragmenting property is kept even if the drill is seized, a chip made at the beginning of drilling can be securely processed so that the occurrence of a chip continued in a spiral state can be presented. Therefore, it can be prevented for such a chip to deteriorate the surface roughness of a drilled hole, and, thus, a hole can be smoothly drilled in the overall drilling operation.

The above and other (a) objects, (b) advantages, (c) features and (d) aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

Figure 1:
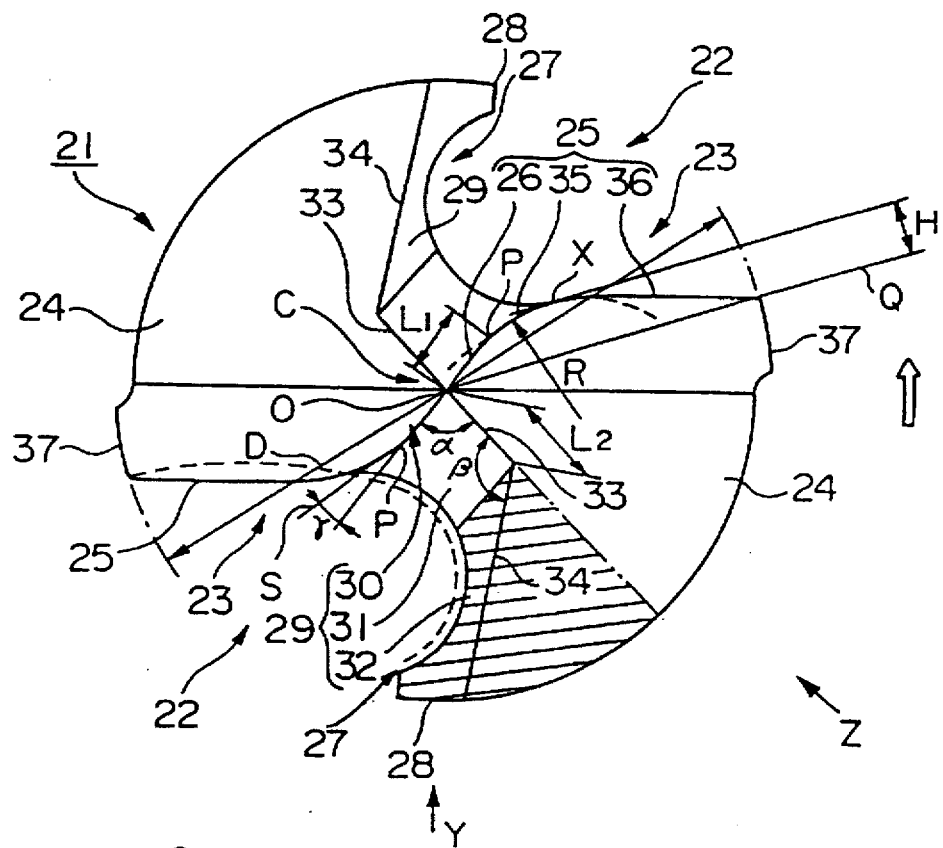
FIG. 1 is a view showing an embodiment of the present invention viewed from the extreme end (e.g. tip end) of the axial line 0 of a drill.

FIGS. 1-4 show an embodiment of the present invention, having a drill main body 21 formed of a hard material, such as a cemented carbide, or the like, and formed as substantially a rod shape. The drill main body 21 is arranged such that a cutting edge portion is formed at the extreme end of a shank (not shown), two chip discharge flutes 22, 22, which are twisted to the rear side of a drill rotational direction (counterclockwise direction in FIG. 1 and FIG. 4), are formed from the tip of the cutting edge portion to the base side thereof at equal intervals in the circumferential direction, and a pair of cutting edges 25, 25 are formed along the intersecting ridge where a wall surface 23 facing to the drill rotational direction of the chip discharge flutes 22, 22 intersects with the tip flank 24 of the drill main body in such a manner that the cutting edges 25, 25 are made symmetrical with respect to the drill rotational center (point of intersection of the extreme end flank 24 with the axial line 0) of the tip of the drill main body 21.

Figure 9:
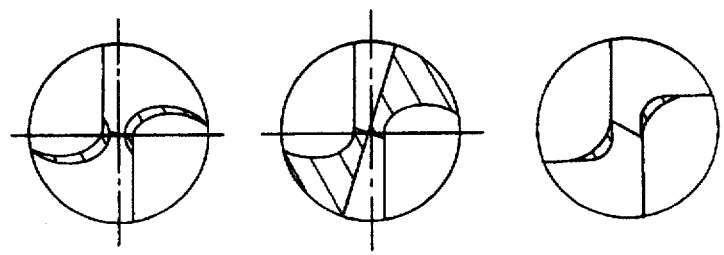
FIG. 9 is an explanatory view showing shapes of thinning.

A so-called cross thinning (note: shapes of thinning are classified in three types as viewed from the point of the drill—S type, X type (cross thinning), and N type, as shown in FIG. 9) is applied to a thick core portion at the tip of the drill main body 21 and a first cutting edge (thinning edge) 26 is formed by the cross thinning, the first cutting edge 26 linearly extends substantially from the rotational center C of the drill and constitutes the internal circumference of the above cutting edge 25. Note, the first cutting edge 26 need not strictly stretch to the rotation center C of the drill, but it may rather be formed from a position slightly spaced apart from the rotation center of drill C when cracking of the rotation center C of the drill caused by stress concentration is taken into consideration.

Figure 10:
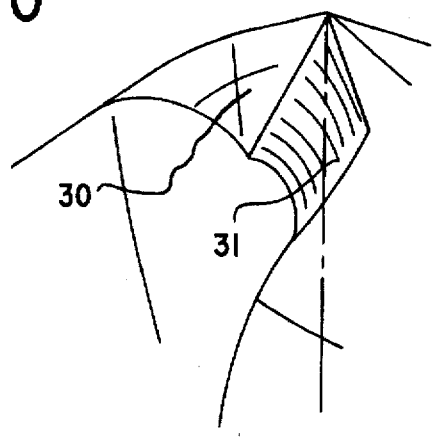
FIG. 10 is an explanatory partial side elevational view of the embodiment shown in FIG. 1.

On the other hand, a thinning surface 29 which reaches the heel 28 side of the drill main body 21 from the rotation center C of the drill is formed by a thinning at the intersecting portion where the wall surface 27, facing to the rear side of the drill rotational direction of the chip discharge flute 22, intersects with the extreme end flank 24 when viewed from the extreme end of the axial line direction. In this embodiment, the thinning surface 29 is disposed to substantially stretch to the rotation center C of the drill and is composed of three thinning surfaces 30 to 32; the first thinning surface 30 defines the above first cutting edge 26 along the top of the surface 30 at an intersecting ridge which intersects with the tip flank 24; the second thinning surface 31 is disposed so as to substantially stretch to the rotation center C of the drill while facing to the external circumference side of the drill main body 21 and intersects with the first thinning surface 30 at the bottom of the first thinning surface 30 (31 has a curved concave shape as best seen in FIG. 10); and the third thinning surface 32 is disposed on the heel side 28 of the second thinning surface 31 while facing to the rear side of the drill rotational direction so as to be curved to a concave shape as with respect to the second thinning surface 31. (In the shown embodiment, the first thinning surface 30 is a plain (flat) surface and is parallel to the axial line of the drill, and the second thinning surface 31 is a near rectangle with one side 33 which forms a straight line and changing, and connecting smoothly, to the opposite side (a part of 27) which forms a concave line, as shown in FIG. 10.)

In the present embodiment, the intersecting angle α at which the first cutting edge 26 intersects with the intersecting ridge 33 (where the second thinning surface 31 intersects with the tip flank 24) is set to the range of from 75° to 95° when viewed from the extreme end of the direction of the axial line 0. Further, the intersecting ridge 33 where the second thinning surface 31 intersects with the tip flank 24 has a length of $L_2$ set to be not greater than 0.2×D with respect to the outside diameter D of the drill when viewed from the extreme end of the direction of the axial line 0, such as shown in FIG. 1. Further, the intersecting angle β at which the intersecting ridge 33 (where the second thinning surface 31 intersects with the tip flank 24) and the intersecting ridge 34 (where the third thinning surface 32 intersects with the tip flank 24) is set to the range of from 90° to 140° when viewed from the extreme end of the direction of the axial line 0.

On the other hand, the cutting edge 25 is also composed of three portions in this embodiment. That is, the cutting edge 25 is composed of the above first cutting edge 26 which is formed along the intersecting ridge where the first thinning surface 30 intersects with the tip flank 24 and linearly extends substantially from the rotation center C of the drill, a second cutting edge 35 which intersects with the external circumference end of the first cutting edge 26 at an obtuse angle and extends to the external circumference side while having a convex curve swelling toward the drill rotational direction, and a third cutting edge 36 which linearly extends toward the external circumference side while coming into smooth contact with the external circumference end of the second cutting edge 35, when viewed from the extreme end of the direction of the axial line 0.

The first cutting edge 26 has a length $L_1$ set to be in the range from 0.05×D to 0.15×D with respect to the outside diameter D of the drill when viewed from the extreme end of the direction of the axial line 0, and the convex curve drawn by the second cutting edge 35 has a radius of curvature R set to the range of from 0.18×D to 0.3×D when viewed from the extreme end of the direction of the axial line 0. Further, the angle γ at which the tangential line S of the second cutting edge 35 intersects with the first cutting edge 26 at the point of intersection P with the first cutting edge 26 is set to the range of from 5° to 20°, and, thus, the first cutting edge 26 and the second cutting edge 35 are connected to each other through the point P of intersection.

Note, when a virtual line Q connecting the rotation center C of the drill to the external circumference end of the cutting edge 25, i.e., the external circumference end of the third cutting edge 36, is imagined in this embodiment (viewing from the extreme end of the direction of the axial line 0), the height H from the apex X of the second cutting edge 35 to the virtual line Q is set to the range of from 0.065×D to 0.09×D with respect to the outside diameter D of the drill. That is, the distance between the virtual line Q and the line which is in contact with the second cutting edge 35 in parallel with the virtual line Q is set to the range of from 0.065×D to 0.09×D.

Figure 4:
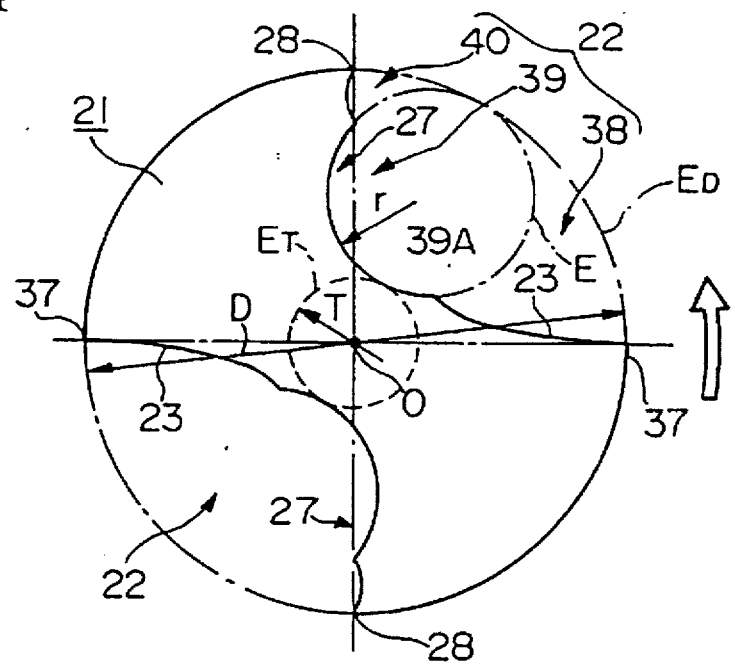
FIG. 4 is a cross sectional view of the embodiment shown in FIG. 1 which is downward and orthogonal to the axial line 0.
Figure 5:
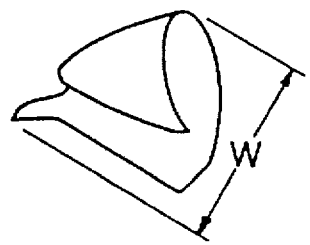
FIG. 5 is a view showing a chip made by the cutting edge of the embodiment of FIG. 1.
Figure 6:
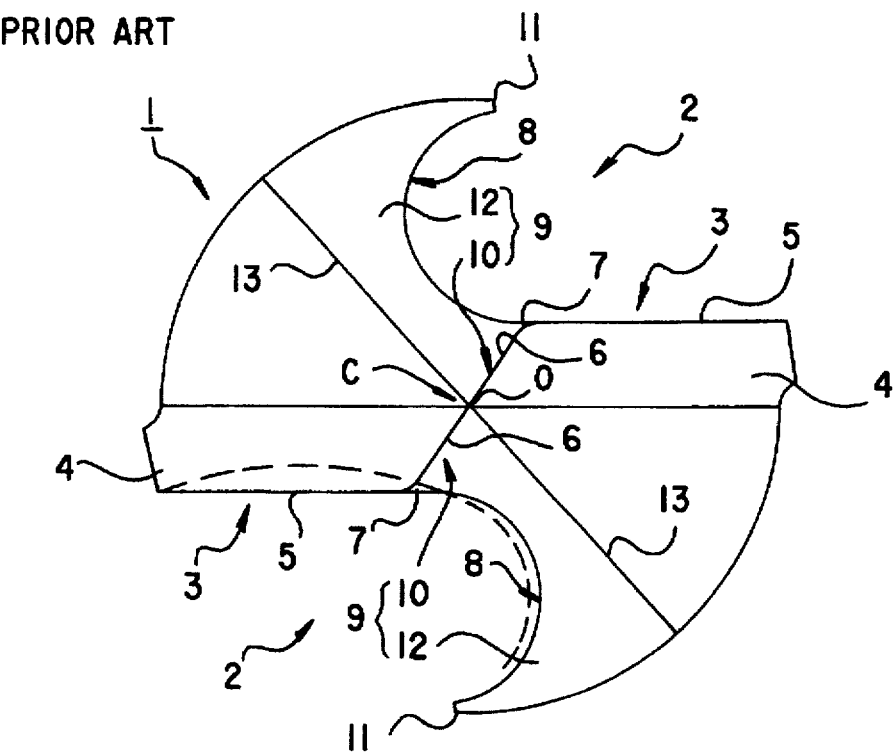
FIG. 6 is a view of a conventional drill viewed from the extreme end of the axial line 0.
Figure 7:
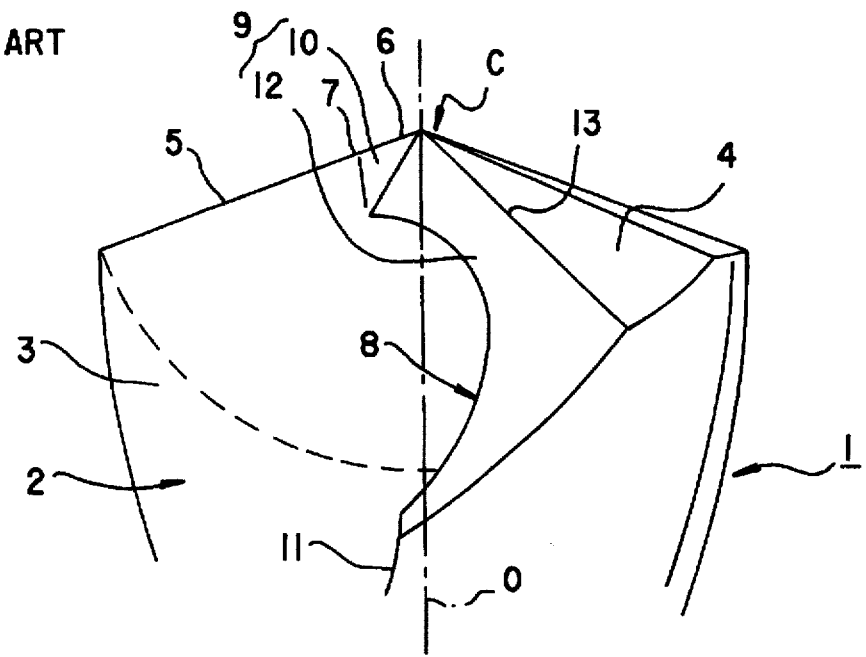
FIG. 7 is a side elevational view of the conventional example shown in FIG. 6.
Figure 8:
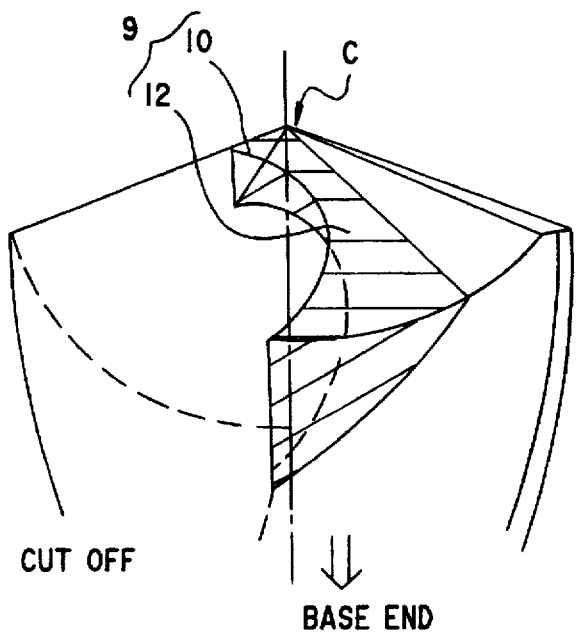
FIG. 8 is a side elevational view showing a cut area of a drill.

Further, in the shown embodiment, the chip discharge flute 22 is also composed of three flutes, i.e., a first flute 38, a second flute 39 and a third flute 40 which are sequentially disposed from the margin 37 side of the drill main body 21 to the heel 28 side as shown in FIG. 4. These flutes 38–40 are formed to be twisted according to the twist of the chip discharge flute 22 from the tip of the drill main body 21 to the base end thereof while maintaining a certain width, respectively. Further, each of the flutes 38–40 has a bottom surface (wall surface) curved to a concave shape in the cross section thereof orthogonal to the axial line 0, and these bottom surfaces are located adjacent to each other by being curved to the concave shape at an obtuse angle from each other.

The bottom surface of the first flute 38 which is located on the margin 37 side constitutes the above wall surface 23 facing to the drill rotational direction of the chip discharge flute 22, and the above third cutting edge 36 is formed along the intersecting ridge where the bottom surface (wall surface) of the first flute 38 intersects with the tip flank 24. Further, the bottom surface of the second flute 39 adjacent to the first flute 38 and the bottom surface of the third flute 40 located on the heel 28 side constitute the above wall surface 27 facing to the rear side of the drill rotational direction of the chip discharge flute 22, and, thus, the thinning surface 29 is formed at the intersecting portion where the bottom surfaces of these second and third flutes 39 and 40 intersect with the tip flank 24.

Note, the second flute 39 is formed as the flute which is the most concaved inwardly in the diameter direction of the drill main body 21, and, thus, the core thickness T of the drill of this embodiment is determined by the depth of the second flute 39. In the shown embodiment, the bottom surface 39A of the second flute 39 is formed to exhibit an approximately arc shape in a cross section orthogonal to the axial line 0 and the arc has a radius r set to 0.9–1.2 times the radius of a circle E which is inscribed to the outside diameter circle $E_D$ of the drill in the cross section thereof (and circumscribed to the circle $E_T$ and formed by the core thickness T of the drill) so that the radius r is substantially equal to the radius of the circle E. However, the outside diameter circle $E_D$ of the drill is a circle whose diameter is set to the outside diameter D of the drill about the axial line 0 in the cross section orthogonal to the axial line 0, and the circle $E_T$ formed by the core thickness T of the drill is a circle having a diameter set to the core thickness T about the axial line 0 likewise in the above cross section. Note, the bottom surface 39A of the second flute 39 need not be strictly formed to the arc in its cross section but may be formed to a surface having a concave shape with a radius of curvature r set within the above range.

In the drill arranged as described above, the third thinning surface 32 (of the first to third thinning surfaces 30–32 constituting the thinning surface 29) is disposed such that it faces to the rear side of the drill rotational direction and is formed to a concave shape with respect to the second thinning surface 31, and, thus, each of the intersecting ridges 26 (first cutting edge), 33 and 34 where the thinning surfaces 30–32 intersect with the tip flank 24, respectively exhibits a "C" shape opening to the external circumference side of the drill main body 21 when viewed from the extreme end of the direction of the axial line 0.

Consequently, in the drill of this embodiment, since the tip flank is not entirely cut out on the heel side thereof by thinning as in the case of the above conventional drill and the third thinning surface 32 is disposed to be curved to a concave shape with respect to the second thinning surface 31, the wall thickness at the tip of the drill main body 21 on the heel 28 side in the circumferential direction thereof can be sufficiently secured in the portions shown by phantom lines. (The portion shown by phantom lines means the portion shown by slanting lines.) Therefore, not only the strength and rigidity of the drill main body 21 can be increased at the tip thereof but also the strength of the cutting edge 25 itself can be increased because the strength and rigidity of the cutting edge 25 are particularly increased on the rear side of the drill rotational direction thereof, whereby the breakage and the like of the cutting edge 25 can be prevented. (The wall thickness, on the heel side in the circumferential direction shown by slanting lines, increases the strength and rigidity of the drill.)

Figure 2:
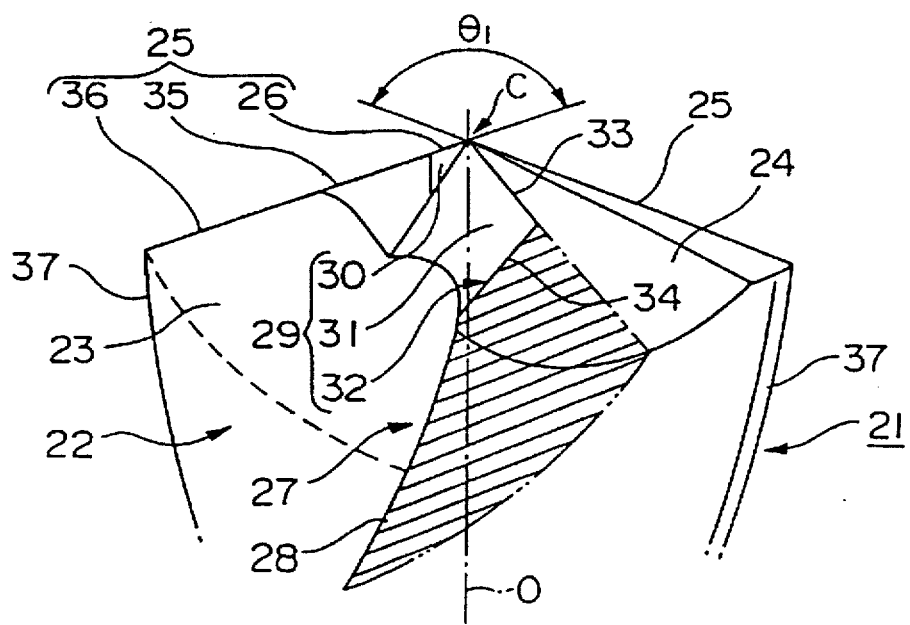
FIG. 2 is a side elevational view of the embodiment shown in FIG. 1 which is viewed from a Y direction shown in FIG. 1 (direction orthogonal to a third cutting edge)

In the drill arranged as described above, since the tip flank 24 is not entirely cut out on the heel 28 side thereof, a chip made to draw a fan shape about the rotational center of drill C as shown by the phantom lines in FIG. 1 and FIG. 2 is curled while coming into contact with the wall surface 27 of the chip discharge flute 22 with a sufficient contact length. Therefore, according to the drill arranged as described above, a good chip fragmenting property can be secured, whereby a chip processing performance can be improved by preventing the clogging of chips and the like.

Moreover, since this good chip fragmenting property is sufficiently exhibited at the beginning of drilling, chips can be securely processed even if a drill is seized so that the creation of a long continuous free spiral chip can be prevented beforehand. As a result, the deterioration of a degree of roughness of the internal circumference of a drilled hole and the winding of a chip around the drill main body 21 can be avoided, so that drilling can be smoothly carried out through the entire drilling operation.

Although this embodiment is arranged such that the intersecting angle α at which the first cutting edge 26 intersects with the intersecting ridge 33 (where the second thinning surface 31 intersects with the tip flank 24) is set to the range of from 75° to 95° in the above thinning surface when viewed from the extreme end of the axial line 0, this is because if the intersecting angle α is below 75°, the first thinning surface 30 excessively approaches the second thinning surface 31 through the rotation center C of the drill, and, thus, a space for creating, in particular, the center side portion of a chip cannot be sufficiently secured and there is a possibility that a chip is clogged. On the contrary, if the intersecting angle α exceeds 95°, since the wall thickness in the circumferential direction from the first cutting edge 26 to the thinning surface 29 on the rear side in the drill rotational direction thereof is reduced and the strength of the drill main body 21 and cutting edge 25 is lowered in the vicinity of the rotation center of drill C, there is a possibility that breakage and cracking may be caused depending upon the drilling conditions, and the like.

Further, although this embodiment is arranged such that the intersecting angle β (at which the intersecting ridge 33 where the second thinning surface 31 intersects with the tip flank 24 intersects with the intersecting ridge 34 where the third thinning surface 32 intersects with the tip flank 24) is set to 90°–140° when viewed from the extreme end of the direction of the axial line 0, this is because if the intersecting angle β is set to a large angle exceeding 140°, the wall thickness of the cutting edge 25 on the rear side in the drill rotational direction is not also sufficiently secured, and, thus, the strength of the drill main body 21 is lowered and there is a possibility that a chip is difficult to be securely guided to the chip discharge flute 22.

On the contrary, when the intersecting angle β is below 90°, the space of the portion where the second thinning surface 31 intersects with the third thinning surface 34 is narrowed in the direction toward which the center side portion of a chip is discharged, and, thus, a chip discharging property is damaged, and there arises a possibility that the clogging of the chip is caused.

Further, although this embodiment is arranged such that the length $L_2$ of the intersecting ridge 33 where the second thinning surface 31 intersects with the tip flank 24 is set to 0.2×D or less with respect to the outside diameter D of the drill (when viewed from the extreme end of the direction of the axial line 0), this is because if the length $L_2$ of the intersecting ridge 33 exceeds 0.2×D and the second thinning surface 31 is made too wide, the wall thickness of the cutting edge 25 on the rear side in the drill rotational direction is reduced, so that there is a possibility that the strength of the cutting edge 25 at the tip of the drill main body 21 and the strength of the drill main body 21 itself are lowered.

On the other hand, the cutting edge 25 of the drill arranged as described above is composed of the linear first cutting edge (thinning cutting edge) 26 on the side of the rotation center C of the drill, the linear third cutting edge 36 on the external circumference side and the second cutting edge 35 curve to the convex shape between the first and third cutting edges 26 and 36. Since the length $L_1$ of the first cutting edge 26 is set to a relatively short size of 0.05×D–0.15×D with respect to the outside diameter D of the drill (when viewed from the extreme end of the direction of the axial line 0), the range B where the cutting edge 25 has a large tip angle $θ_2$ on the side of the rotation center C of the drill can be suppressed to a small value, so that a drill seizing property can be improved as well as a seizing of the drill can be promptly stabilized.

Figure 3:
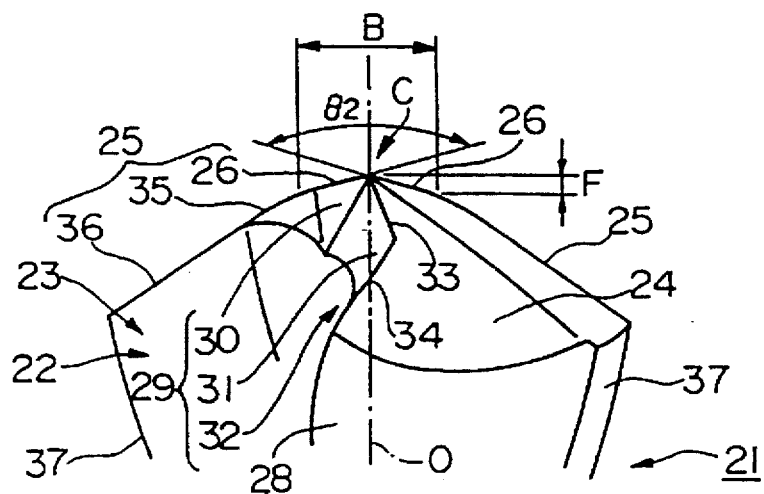
FIG. 3 is a side elevational view of the embodiment shown in FIG. 1 which is viewed from a Z direction shown in FIG. 1 (direction orthogonal to a first cutting edge)

More specifically, when the first cutting edge 26 linearly extends from the rotation center C of the drill and the similarly linear third cutting edge 36 is disposed obliquely upwardly toward the center of the drill as in the case of this embodiment, the tip angle $θ_2$ of the first cutting edge shown in FIG. 3 is larger than the tip angle $θ_1$ of the third cutting edge 36 shown in FIG. 2, so that a drill push force is increased at the rotation center C of the drill and the seizing of the drill is made instable at the rotation center C of the drill (the first cutting edge 26 does not smoothly drill the work).

In the drill of this embodiment, however, the drill seizing property can be improved in such a manner that the length $L_1$ of the first cutting edge 26 is set to a short size as described above and the range in which the push force is increased, i.e., the above range B in which the cutting edge 25 has the large tip angle $θ_2$ is reduced, and the range B can be also suppressed to have a short length (drilling start length) F in the direction of the axial line 0, so that the seizing of the drill can be promptly stabilized. As a result, according to the drill of this embodiment, an increase of an expanding margin in drilling operation can be prevented, and the drilling operation can be carried out with a higher circularity.

Note, when the length $L_1$ of the first cutting edge 26 exceeds 0.15×D, the range B (in which the tip angle is increased) is increased, and, thus, the above advantage cannot be obtained. On the contrary, when the length $L_1$ of the first cutting edge 26 is so short as to be below 0.05×D, the creation of a chip is unbalanced between the center side portion of the chip made by the first cutting edge 26 and the external circumference side portion of the chip made by the second and third cutting edges 35 and 36. As a result, a force attracting the chip to the center is weakened and the chip tends to flow to the external circumference and a chip flow path is changed, so that the chip freely extends, and at the same time a guiding property for guiding the chip to the chip discharge flute 22 is damaged. Thus, there is a possibility that a chip clogs at the beginning of drilling and the roughness of the inner wall surface of a drilled hole is deteriorated.

In the drill arranged as described, since the radius of curvature R of the second cutting edge 35 curved to the convex shape between the fist cutting edge 26 and the third cutting edge 36 is set to a relatively large size of 0.18×D–0.3×D with respect to the outside diameter D of the drill when viewed from the extreme end of the direction of the axial line 0, a high strength can be given to the second edge 35, so that the breakage of the cutting edge 25 can be securely prevented regardless of drilling conditions in cooperation with the advantage of increasing the strength achieved by the thinning surface 29.

Note, if the radius of curvature R of the second cutting edge 35 is below 0.18×D, the above improvement of the strength of the cutting edge cannot be obtained. On the contrary, if the radius is so large as to exceed 0.3×D, the cutting edge 25 is formed to a gentle shape as a whole and a chip cannot be made in a balanced state on the center side and external circumference thereof, and a breaking force for enabling a chip to sufficiently curl cannot be given, so that a chip is extended and there arises a possibility of clogging.

In addition to the aforesaid, the first cutting edge 26 intersects with the second cutting edge 35 at an obtuse angle in the drill arranged as described above and the intersecting angle γ at which both cutting edges 26 and 35 intersect with the tangential line S is set to the range of from 5° to 20° at the point of intersection thereof. Consequently, when the tip angle of the cutting edge 25 changes from the large tip angle $θ_2$ formed by the first cutting edge 26 to the small tip angle $θ_1$ formed by the third cutting edge 36 as described above, it can be prevented that a degree of change is made gradual. As a result, since a distance until the seizing of the cutting edge 25 is stabilized can also be shortened, the seizing property can be further improved, and the seizing can be promptly stabilized in cooperation with the advantage achieved by setting the first cutting edge 26 to the short length $L_1$.

Note, when the intersecting angle γ is below 5°, there is a possibility that the advantage is lost, whereas when the intersecting angle γ is so large as to be 20°, the concentration of drilling stress is increased at the point of intersection P, and, thus, there arises a possibility that the cutting edge is broken.

Further, in the drill of this embodiment, since the height from the virtual line Q connecting the rotation center C of the drill to the external circumference end of the cutting edge 25 to the apex X of the second cutting edge 35 is set to the range of from 0.065×D to 0.09×D with respect to the outside diameter D of the drill when viewed from the extreme end of the direction of the axial line 0, a chip accommodated in the chip discharge flute 22 can be smoothly fed to the base end of the drill main body 21 and effectively discharged.

That is, since the cross section of a chip made by the cutting edge 25 has substantially the same shape as the shape of the cutting edge 25, even if the chip is well curled and fragmented by the effect achieved by the aforesaid thinning surface 29 and the effect achieved by the cutting edge 25, when the height H is too large, the width denoted by W of the chip is increased and the chip is increased and the chip cannot be smoothly accommodated in the chip discharge flute 22, and, thus, there is a possibility that the chip is clogged midway in the chip discharge flute 22.

In the drill of this embodiment, however, the occurrence of clogging of the chip is prevented beforehand by preventing the width W of the chip from being made too large by setting the height H to 0.09×D or less with respect to the outside diameter D of the drill, whereby the chip can be more stably processed.

Note, the reason why the height H of the cutting edge 25 from the virtual line Q is set to 0.065×D or more with respect to the outside diameter D of the drill is that if the height H is excessively small, although the shape of the cutting edge 25 is made flat and the width T of a chip is made small, curling of the chip cannot be accelerated and the shape of the chip capable of being accommodated in the chip discharge flute 22 cannot be obtained on the contrary, and as a result there is a possibility that the chip is clogged.

Moreover, the chip discharge flute 22 has the three flutes (the first, second and third flutes 38–40 in the drill of this embodiment), and the second flute 39 is formed to the innermost circumference of the drill main body 21, so that the bottom surface 39A of the second flute 39 defines the core thickness T of the drill main body 21. Therefore, a chip made by the cutting edge 25 is fed from the first flute 38 to the second flute 39 particularly in the portion thereof on the external circumference side and comes into contact with the bottom 39A and curled to have a smaller size. As a result, according to this embodiment, a chip can be more smoothly and more efficiently discharged, and the occurrence of clogging of the chip can be more securely prevented in the midway of the chip discharge flute 22.

Further, since the radius of curvature R of the second groove 39 of the chip discharge flute 22 is set substantially similarly to the radius of the circle E which is inscribed to the circle $E_D$ formed by the outside diameter of the drill and circumscribed to the circle $E_T$ having the core thickness T in this embodiment, there is also obtained an advantage that a chip is sufficiently curled without coming into contact with the internal circumference of a drilled hole while preventing the chip from being forcibly and rapidly curled and broken at the midway thereof. As a result, it is preferable to set the radius of curvature R of the second flute 39 to about 0.9–1.2 times the radius of the above circle E.

It will be apparent to those skilled in the art that the embodiments described may be varied as discussed above and in other manners, such as to meet particular specialized requirements, without departing from the true spirit and scope of the invention as claimed.

What is claimed is:

1. A drill, compromising:

a drill main body which is rotated about an axial line from a tip end to a base end of the drill main body;

a chip discharge flute formed on a side surface of the drill main body;

a cutting edge formed along an intersecting ridge where a wall surface of said chip discharge flute facing to a drill rotational direction thereof intersects with a tip flank of said drill main body; and a first cutting edge formed at a thinning in a core thick portion at the end tip of said drill main body and linearly extending substantially from a rotational center of the drill main body;

at least three thinning surfaces formed by said thinning at the intersecting portion where the wall surface facing to the rear side of the drill rotational direction intersects with said tip flank, wherein said three thinning surfaces are composed of;

a first thinning surface facing to the drill rotational direction and disposed to substantially stretch to the rotational center of drill and defining said first cutting edge along an intersecting ridge with said tip flank;

a second thinning surface facing to the external circumference of said drill main body, substantially stretching to the rotational center of drill and disposed to intersect with said first thinning surface by being curved to a concave shape; and a third thinning surface facing to the rear side of the drill rotational direction and disposed to the heel side of said second thinning surface so as to be curved to a concave shape with respect to said second thinning surface.

2. A drill according to claim 1, wherein the intersecting angle at which the intersecting ridge of said first thinning surface with said tip flank intersects with the intersecting ridge of said second thinning surface with said tip flank is set to the range of from 75° to 95° when viewed from the extreme end of the direction of the axial line.

3. A drill according to claim 1, wherein the intersecting ridge of said second thinning surface with said tip flank has a length set to 0.2×D or less with respect to the outside diameter D of the drill when viewed from the extreme end of the direction of the axial line.

4. A drill according to claim 1, wherein the intersecting angle at which the intersecting ridge of said second thinning surface with said tip flank intersects with the intersecting ridge of said third thinning surface with said tip flank is set to a range of from 90° to 140° when viewed from the extreme end of the direction of the axial line.

5. A drill according to claim 1, wherein said cutting edge is composed of said first cutting edge, a second cutting edge intersecting with the external circumference end of said first cutting edge at an obtuse angle and linearly extending to form a convex curve and a third cutting edge smoothly coming into contact with the external circumference end of said second cutting edge and linearly extending to be disposed when viewed from the extreme end of the direction of the axial line of said drill main body, said first cutting edge has a length set to a range of from 0.05×D to 0.15×D with respect to the outside diameter D of said drill, the convex curve formed by said second cutting edge has a radius of curvature set to the range of from 0.18×D to 0.3×D, and the intersecting angle of the tangential line of said second cutting edge with said first cutting edge is set to the range of from 5° to 20° when viewed from the extreme end of the direction of the axial line.

6. A drill according to claim 5, wherein the height from the virtual line connecting the rotation center of the drill of said drill main body to the external circumference end of said cutting edge to the apex of said second cutting edge to the virtual line is set to the range of from 0.065×D to 0.09×D with respect to the outside diameter D of said drill when viewed from the extreme end of the direction of the axial line.

7. A drill according to claim 5, wherein the intersecting angle at which the intersecting ridge of said first thinning surface with said tip flank intersects with the intersecting ridge of said second thinning surface with said tip flank is set to the range of from 75° to 95° when viewed from the extreme end of the direction of the axial line.

8. A drill according to claim 5, wherein the intersecting ridge of said second thinning surface with said tip flank has a length set to 0.2×D or less with respect to the outside diameter D of said drill when viewed form the extreme end of the direction of the axial line.

9. A drill according to claim 5, wherein the intersecting angle at which the intersecting ridge of said second thinning surface with said tip flank intersects with the intersecting ridge of said third thinning surface with said tip flank is set to the range of from 90° to 140° when viewed from the extreme end of the direction of the axial line.

10. A drill according to claim 5, wherein said chip discharge flute has first, second and third flutes provided with wall surfaces formed to a concave curve and stretched to each other in a cross section orthogonal to the axial line, said third cutting edge is formed to the intersecting ridge of said first flute on a margin side with said tip flank, whereas said second flute has a wall surface formed to define the core thickness of said drill main body in said cross section.

11. A drill according to claim 10, wherein the radius of curvature of the wall surface of said second flute in said chip discharge flute is set, in a cross section orthogonal to said axial line, to 0.9 to 1.2 times the radius of a circle which is inscribed to the outside diameter circle of said drill whose diameter is set to the outside diameter of said drill about the axial line and circumscribed to a circle whose diameter is set to the core thickness about the axial line.

\* \* \* \* \*